(12) United States Patent
Huang et al.

(10) Patent No.: US 9,473,326 B2
(45) Date of Patent: Oct. 18, 2016

(54) MULTIPLE-INPUT MULTIPLE-OUTPUT ORTHOGONAL FREQUENCY DIVISION MULTIPLEXING COMMUNICATION SYSTEM AND METHOD FOR SIGNAL COMPENSATION

(71) Applicant: Huawei Technologies Co., Ltd., Shenzhen (CN)

(72) Inventors: Huang Huang, Shenzhen (CN); Xi Yan, Shenzhen (CN); Guangjian Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/942,928

(22) Filed: Nov. 16, 2015

(65) Prior Publication Data

US 2016/0072644 A1    Mar. 10, 2016

Related U.S. Application Data

(63) Continuation of application No. PCT/CN2013/085495, filed on Oct. 18, 2013.

(30) Foreign Application Priority Data

May 16, 2013 (CN) .......................... 2013 1 0181256

(51) Int. Cl.
*H04K 1/10* (2006.01)
*H04L 27/28* (2006.01)
(Continued)

(52) U.S. Cl.
CPC ......... *H04L 25/0204* (2013.01); *H04B 7/0413* (2013.01); *H04L 5/0007* (2013.01);
(Continued)

(58) Field of Classification Search
CPC ........... H04L 25/0204; H04L 25/0228; H04L 2027/003; H04L 5/0007; H04L 25/0224; H04L 27/261; H04L 27/2647; H04L 5/0023; H04B 7/0413
USPC ................................ 375/260, 346, 247, 299
See application file for complete search history.

(56) References Cited

U.S. PATENT DOCUMENTS 7,313,194 B2    12/2007  Bar-Ness et al.
8,023,583 B2     9/2011  Bar-Ness et al.
(Continued)

FOREIGN PATENT DOCUMENTS

CN          1825841 A      8/2006
CN        101076001 A     11/2007
(Continued)

OTHER PUBLICATIONS

Zou et al., "Compensation of Phase Noise in OFDM Wireless Systems," IEEE Transactions on Signal Processing, vol. 55, No. 11, pp. 5407-5424, Institute of Electrical and Electronics Engineers, New York, New York (Nov. 2007).
(Continued)

*Primary Examiner* — Phuong Phu
(74) *Attorney, Agent, or Firm* — Leydig, Voit & Mayer, Ltd.

(57) ABSTRACT

Embodiments of the present invention provide a method for signal compensation. The method includes: receiving, by a receiver via N receiving antennas, a plurality of channel estimation preamble signals sent by M transmitting antennas of a remote transmitter, wherein the plurality of channel estimation preamble signals contain measurement signals of the M transmitting antennas; determining, by the receiver, channel estimation parameters and channel phase shift parameters according to the measurement signals of the M transmitting antennas of the remote transmitter; and determining, by the receiver, signal compensation according to the channel estimation parameters and the channel phase shift parameters. According to the method for signal compensation and the multiple-input multiple-output orthogonal frequency division multiplexing communication system provided by the embodiments of the present invention, accuracy of an estimated value of transmitted data is improved.

11 Claims, 5 Drawing Sheets

(51) Int. Cl.
    H04L 25/02    (2006.01)
    H04B 7/04     (2006.01)
    H04L 5/00     (2006.01)
    H04L 27/26    (2006.01)
    H04L 27/00    (2006.01)

(52) U.S. Cl.
    CPC ....... *H04L25/0224* (2013.01); *H04L 25/0228* (2013.01); *H04L 27/261* (2013.01); *H04L 27/2647* (2013.01); *H04L 2027/003* (2013.01)

(56) References Cited

U.S. PATENT DOCUMENTS

| | | |
|---|---|---|
| 2006/0193392 A1 | 8/2006 | Kim et al. |
| 2006/0262868 A1 | 11/2006 | Leshem |
| 2007/0147527 A1* | 6/2007 | Egashira ............... H04L 5/0023 375/260 |
| 2007/0153927 A1 | 7/2007 | Ma et al. |
| 2010/0015922 A1 | 1/2010 | Kawai |
| 2012/0051476 A1 | 3/2012 | Shi et al. |

FOREIGN PATENT DOCUMENTS

| | | |
|---|---|---|
| CN | 101267422 A | 9/2008 |
| CN | 101601200 A | 12/2009 |
| CN | 102082744 A | 6/2011 |
| WO | WO 2005088882 A1 | 9/2005 |

OTHER PUBLICATIONS

Pollet et al., "Effect of carrier phase jitter on single-carrier and multi-carrier QAM systems," 1995 IEEE International Conference on Communications, vol. 2, Seattle, Washington, pp. 1046-1050, Institute of Electrical and Electronics Engineers, New York, New York (Jun. 18-22, 1995).

Bittner et al., "Exploiting Phase Noise Properties in the Design of MIMO-OFDM Receivers," IEEE Wireless Communications and Networking Conference, Las Vegas, Nevada, pp. 940-945, Institute of Electrical and Electronics Engineers, New York, New York (Mar. 31-Apr. 3, 2008).

Andrews et al., "Fundamentals of WiMAX; Understanding Broadband Wireless Networking," pp. xxi-449, Prentice Hall, Upper Saddle River, New Jersey (Mar. 9, 2007).

"IEEE Standard for Information Technology—Telecommunications and information exchange between systems—Local and metropolitan area networks—Specific requirements; Part 11: Wireless LAN Medium Access Control (MAC) and Physical Layer (PHY) Specifications," IEEE Draft P802.11-REVmb/D9.0, pp. i-2622, Institute of Electrical and Electronics Engineers, New York, New York (May 2011).

Corvaja et al., "Joint Channel and Phase Noise Compensation for OFDM in Fast-Fading Multipath Applications," IEEE Transactions on Vehicular Technology, vol. 58, No. 2, pp. 636-643, Institute of Electrical and Electronics Engineers, New York, New York (Feb. 2009).

Van Zelst, "MIMO OFDM for Wireless LANs," pp. 1-229, Eindhoven University of Technology, Eindhoven, Netherlands (Apr. 2004).

Syrjala et al., "Phase Noise Modelling and Mitigation Techniques in OFDM Communications Systems," 2009 Wireless Telecommunications Symposium, Prague, Czech Republic, pp. 1-7, Institute of Electrical and Electronics Engineers, New York, New York (Apr. 22-24, 2009).

Paul et al., "Wireless LAN Comes of Age: Understanding the IEEE 802.11n Amendment," IEEE Circuits and Systems Magazine, pp. 28-54, Institute of Electrical and Electronics Engineers, New York, New York (First Quarter 2008).

\* cited by examiner

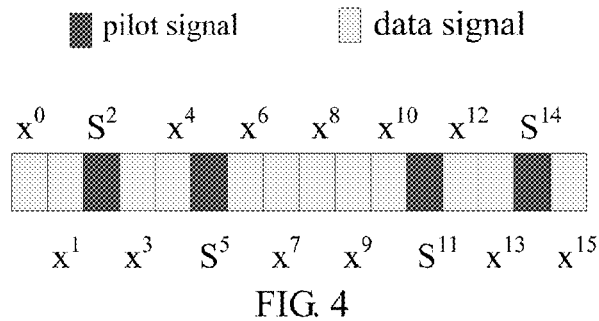

FIG. 4

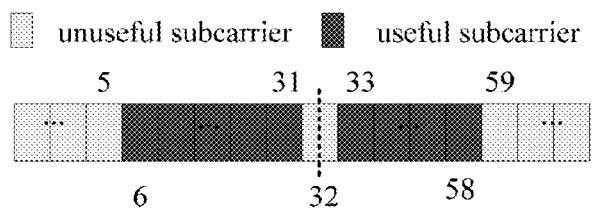

FIG. 5

| the transmitter generates a plurality of channel estimation preamble signals, wherein any two adjacent measurement signals of one of the plurality of channel estimation preamble signals are isolated by at least one void subcarrier | ⟶ 601 |

| he transmitter sends the plurality of channel estimation preamble signals via M transmitting antennas to N receiving antennas of a remote receiver, wherein M and N are integers larger than 1 | ⟶ 602 |

FIG. 6

MULTIPLE-INPUT MULTIPLE-OUTPUT ORTHOGONAL FREQUENCY DIVISION MULTIPLEXING COMMUNICATION SYSTEM AND METHOD FOR SIGNAL COMPENSATION

CROSS-REFERENCE TO RELATED APPLICATIONS

This application is a continuation of International Patent Application No. PCT/CN2013/085495, filed on Oct. 18, 2013, which claims priority to Chinese Patent Application No. 201310181256.2, filed on May 16, 2013, both of which are hereby incorporated by reference in their entireties.

TECHNICAL FIELD

Embodiments of the present invention relate to the field of communications, and more particularly, to a multiple-input multiple-output orthogonal frequency division multiplexing communication system and a method for signal compensation.

BACKGROUND

Future broadband wireless communication systems will meet a variety of integrated service needs from voice to multimedia under a premise of high stability and high data transmission rate. To implement fast transmission of integrated service contents on limited spectrum resource, a technology with very high spectrum efficiency is needed. Multiple-input multiple-output (Multiple-Input Multiple-Output, MIMO) technology fully develops space resource, and implements multiple inputs and multiple outputs by use of a plurality of antennas, and channel capacity may be increased by times without a need of adding spectrum resource or antenna transmission power. Orthogonal frequency division multiplexing (Orthogonal Frequency Division Multiplex, OFDM) technology is one of multicarrier narrowband transmissions, and subcarriers thereof are mutually orthogonal, and thus may utilize spectrum resources effectively. An effective combination of the two (MIMO-OFDM) may overcome an adverse influence caused by a multipath effect and frequency selective fading, realize high reliability of signal transmission, and may further increase system capacity and improve spectrum efficiency.

However, an MIMO-OFDM system is easily to be affected by phase noise and frequency offset.

SUMMARY

Embodiments of the present invention provide a multiple-input multiple-output orthogonal frequency division multiplexing communication system and a method for signal compensation, which can improve demodulation accuracy of transmitted data to a certain extent.

In a first aspect, a method for signal compensation is provided, including: receiving, by a receiver via N receiving antennas, a plurality of channel estimation preamble signals sent by M transmitting antennas of a remote transmitter, wherein the plurality of channel estimation preamble signals contain measurement signals of the M transmitting antennas, and M and N are integers larger than 1; determining, by the receiver, channel estimation parameters and channel phase shift parameters from the M transmitting antennas of the remote transmitter to the N receiving antennas of the receiver according to the measurement signals of the M transmitting antennas of the remote transmitter; and determining, by the receiver, signal compensation from the M transmitting antennas of the remote transmitter to the N receiving antennas of the receiver according to the channel estimation parameters and the channel phase shift parameters.

In combination with the first aspect, in a first possible implementation manner, it is specifically implemented as follows: a subcarrier set for sending a measurement signal of the $m^{th}$ transmitting antenna in the M transmitting antennas is equal to a subcarrier set of the $m^{th}$ transmitting antenna, $\forall m=\{1, \ldots, M\}$, and the measurement signal includes a pilot signal.

In combination with the first aspect or the first possible implementation manner of the first aspect, in a second possible implementation manner, the determining, by the receiver, channel estimation parameters and channel phase shift parameters from the M transmitting antennas of the remote transmitter to the N receiving antennas of the receiver according to the measurement signals of the M transmitting antennas of the remote transmitter, includes:

determining, by the receiver, at least one channel estimation parameter and at least one channel phase shift parameter of the $m^{th}$ transmitting antenna for the $k^{th}$ subcarrier according to at least one measurement signal of the $m^{th}$ transmitting antenna on the $k^{th}$ subcarrier, wherein the $m^{th}$ transmitting antenna is one of the M transmitting antennas, $\forall m=\{1, \ldots, M\}$; and determining, by the receiver, an average value of the at least one channel estimation parameter of the $m^{th}$ transmitting antenna for the $k^{th}$ subcarrier and an average value of the at least one channel phase shift parameter of the $m^{th}$ transmitting antenna for the $k^{th}$ subcarrier as a channel estimation parameter and a channel phase shift parameter of the $m^{th}$ transmitting antenna for the $k^{th}$ subcarrier.

In combination with the first aspect or the first possible implementation manner of the first aspect or the second possible implementation manner of the first aspect, in a third possible implementation manner, the determining, by the receiver, the channel estimation parameters and the channel phase shift parameters from the M transmitting antennas of the remote transmitter to the N receiving antennas of the receiver according to the measurement signals of the M transmitting antennas of the remote transmitter, includes:

determining, by the receiver, the channel estimation parameters from the M transmitting antennas of the remote transmitter to the N receiving antennas of the receiver according to measurement signals transmitted by the M transmitting antennas of the remote transmitter and measurement signals received by the N receiving antennas of the receiver; and determining, by the receiver, the channel phase shift parameters from the M transmitting antennas of the remote transmitter to the N receiving antennas of the receiver according to the measurement signals transmitted by the M transmitting antennas of the remote transmitter, the measurement signals received by the N receiving antennas of the receiver, and the channel estimation parameters from the M transmitting antennas of the remote transmitter to the N receiving antennas of the receiver.

In combination with the third possible implementation manner of the first aspect, in a fourth possible implementation manner, it is specifically implemented as follows: a formula for the receiver to determine the channel estimation parameters from the M transmitting antennas of the remote transmitter to the N receiving antennas of the receiver according to the measurement signals transmitted by the M transmitting antennas of the remote transmitter and the measurement signals received by the N receiving antennas of the receiver is specifically as follows:

$$\hat{H}_{nm}^{k} = y_n^k(l)/s^k, \forall n=\{1, \ldots, N\}, k \in K$$

wherein $\hat{H}_{nm}^{k}$ represents a channel parameter for the $k^{th}$ subcarrier from the $m^{th}$ transmitting antenna of the remote transmitter to the $n^{th}$ receiving antenna of the receiver, $y_n^k(l)$ represents a measurement signal received by the $n^{th}$ receiving antenna of the receiver, $s^k$ represents a measurement signal sent on the $k^{th}$ subcarrier by the remote transmitter, and K represents a set of subcarriers of the $m^{th}$ transmitting antenna of the remote transmitter; and wherein a formula for the receiver to determine the channel phase shift parameters from the M transmitting antennas of the remote transmitter to the N receiving antennas of the receiver according to the measurement signals transmitted by the M transmitting antennas of the remote transmitter, the measurement signals received by the N receiving antennas of the receiver, and the channel estimation parameters from the M transmitting antennas of the remote transmitter to the N receiving antennas of the receiver, is specifically as follows:

$$\begin{bmatrix} e^{j\hat{\theta}_{k_1,l}} \\ \vdots \\ e^{j\hat{\theta}_{k_M,l}} \end{bmatrix} = \begin{bmatrix} s_1^k & \cdots & 0 \\ \vdots & \vdots & \vdots \\ 0 & \cdots & s_M^k \end{bmatrix} [[\hat{H}^k]^\dagger \hat{H}^k]^{-1} [\hat{H}^k]^\dagger \begin{bmatrix} y_1^k(l) \\ \vdots \\ y_N^k(l) \end{bmatrix}$$

wherein $e^{j\hat{\theta}_{k_m,l}}$ represents a channel phase shift parameter of the $m^{th}$ transmitting antenna of the remote transmitter, $y_n^k(l)$ represents a measurement signal received by the $n^{th}$ receiving antenna of the receiver, $s_m^k$ represents a measurement signal transmitted on the $k^{th}$ subcarrier by the $m^{th}$ transmitting antenna of the remote transmitter, and $[\hat{H}^k]^\dagger$ represents a conjugate matrix of $\hat{H}^k$, $\forall m=\{1, \ldots, M\}$, $\forall n=\{1, \ldots, N\}$.

In combination with the fourth possible implementation manner of the first aspect, in a fifth possible implementation manner, it is specifically implemented as follows: a formula for the receiver to determine the signal compensation from the M transmitting antennas of the remote transmitter to the N receiving antennas of the receiver according to the channel estimation parameters and the channel phase shift parameters is specifically as follows:

$$\begin{bmatrix} \hat{x}_1^k \\ \vdots \\ \hat{x}_M^k \end{bmatrix} = \begin{bmatrix} e^{-j\hat{\theta}_{k_1,l}} & \cdots & 0 \\ \vdots & \vdots & \vdots \\ 0 & \cdots & e^{-j\hat{\theta}_{k_M,l}} \end{bmatrix} [[\hat{H}^k]^\dagger \hat{H}^k]^{-1} [\hat{H}^k]^\dagger \begin{bmatrix} y_1^k(l) \\ \vdots \\ y_N^k(l) \end{bmatrix}$$

wherein $\hat{x}_m^k$ represents a quadrature amplitude modulation (QAM) signal of the $k^{th}$ subcarrier transmitted by the $m^{th}$ transmitting antenna.

In a second aspect, a method for sending a signal is provided, including: generating, by a transmitter, a plurality of channel estimation preamble signals, wherein any two adjacent measurement signals of one of the plurality of channel estimation preamble signals are isolated by at least one void subcarrier; and sending, by the transmitter via M transmitting antennas, the plurality of channel estimation preamble signals to N receiving antennas of a remote receiver, wherein M and N are integers larger than 1.

In combination with the second aspect, in a first possible implementation manner, the sending, by the transmitter via M transmitting antennas, the plurality of channel estimation preamble signals to N receiving antennas of a remote receiver, includes:

sending, by the transmitter via M transmitting antennas in turns, the plurality of channel estimation preamble signals to the N receiving antennas of the remote receiver, wherein any two transmitting antennas in the M transmitting antennas do not simultaneously send the plurality of channel estimation preamble signals.

In a third aspect, a receiver is provided, including: N receiving antennas, configured to receive a plurality of channel estimation preamble signals sent by M transmitting antennas of a remote transmitter, wherein the plurality of channel estimation preamble signals contain measurement signals of the M transmitting antennas, and M and N are integers larger than 1; and a determining unit, configured to determine channel estimation parameters and channel phase shift parameters from the M transmitting antennas of the remote transmitter to the N receiving antennas of the receiver according to the measurement signals of the M transmitting antennas of the remote transmitter; wherein the determining unit is further configured to determine signal compensation from the M transmitting antennas of the remote transmitter to the N receiving antennas of the receiver according to the channel estimation parameters and the channel phase shift parameters.

In combination with the third aspect, in a first possible implementation manner, it is specifically implemented as follows: a subcarrier set for sending a measurement signal of the $m^{th}$ transmitting antenna in the M transmitting antennas is equal to a subcarrier set of the $m^{th}$ transmitting antenna, $\forall m=\{1, \ldots, M\}$, and the measurement signal includes a pilot signal.

In combination with the third aspect or the first possible implementation manner of the third aspect, in a second possible implementation manner, when determining channel estimation parameters and channel phase shift parameters from the M transmitting antennas of the remote transmitter to the N receiving antennas of the receiver according to the measurement signals of the M transmitting antennas of the remote transmitter, the determining unit is specifically configured to:

determine at least one channel estimation parameter and at least one channel phase shift parameter of the $m^{th}$ transmitting antenna for the $k^{th}$ subcarrier according to at least one measurement signal of the $m^{th}$ transmitting antenna on the $k^{th}$ subcarrier, wherein the $m^{th}$ transmitting antenna is one of the M transmitting antennas, $\forall m=\{1, \ldots, M\}$; and determine an average value of the at least one channel estimation parameter of the $m^{th}$ transmitting antenna for the $k^{th}$ subcarrier and an average value of the at least one channel phase shift parameter of the $m^{th}$ transmitting antenna for the $k^{th}$ subcarrier as a channel estimation parameter and a channel phase shift parameter of the $m^{th}$ transmitting antenna for the $k^{th}$ subcarrier.

In combination with the third aspect or the first possible implementation manner of the third aspect or the second possible implementation manner of the third aspect, in a third possible implementation manner, when determining, by the receiver, the channel estimation parameters and the channel phase shift parameters from the M transmitting antennas of the remote transmitter to the N receiving antennas of the receiver according to the measurement signals of the M transmitting antennas of the remote transmitter, the determining unit is specifically configured to: determine the channel estimation parameters from the M transmitting antennas of the remote transmitter to the N receiving antennas of the receiver according to measurement signals transmitted by the M transmitting antennas of the remote transmitter and measurement signals received by the N receiving antennas of the receiver; and determine the channel phase shift parameters from the M transmitting antennas of the remote transmitter to the N receiving antennas of the receiver according to the measurement signals transmitted by the M transmitting antennas of the remote transmitter, the measurement signals received by the N receiving antennas of the receiver, and the channel estimation parameters from the M transmitting antennas of the remote transmitter to the N receiving antennas of the receiver.

In combination with the third possible implementation manner of the third aspect, in a fourth possible implementation manner, it is specifically implemented as follows: a formula for the determining unit to determine the channel estimation parameters from the M transmitting antennas of the remote transmitter to the N receiving antennas of the receiver according to the measurement signals transmitted by the M transmitting antennas of the remote transmitter and the measurement signals received by the N receiving antennas of the receiver is specifically as follows:

$$\hat{H}_{nm}^k = y_n^k(l)/s^k, \forall n=\{1,\ldots,N\}, k \in K$$

wherein $\hat{H}_{nm}^k$ represents a channel parameter for the $k^{th}$ subcarrier from the $m^{th}$ transmitting antenna of the remote transmitter to the $n^{th}$ receiving antenna of the receiver, $y_n^k(l)$ represents a measurement signal received by the $n^{th}$ receiving antenna of the receiver, $s^k$ represents a measurement signal sent on the $k^{th}$ subcarrier by the remote transmitter, and K represents a set of subcarriers of the $m^{th}$ transmitting antenna of the remote transmitter; and wherein a formula for the determining unit to determine the channel phase shift parameters from the M transmitting antennas of the remote transmitter to the N receiving antennas of the receiver according to the measurement signals transmitted by the M transmitting antennas of the remote transmitter, the measurement signals received by the N receiving antennas of the receiver, and the channel estimation parameters from the M transmitting antennas of the remote transmitter to the N receiving antennas of the receiver, is specifically as follows:

$$\begin{bmatrix} e^{j\hat{\theta}_{k_1,l}} \\ \vdots \\ e^{j\hat{\theta}_{k_M,l}} \end{bmatrix} = \begin{bmatrix} s_1^k & \cdots & 0 \\ \vdots & \vdots & \vdots \\ 0 & \cdots & s_M^k \end{bmatrix} [[\hat{H}^k]^\dagger \hat{H}^k]^{-1} [\hat{H}^k]^\dagger \begin{bmatrix} y_1^k(l) \\ \vdots \\ y_N^k(l) \end{bmatrix}$$

wherein $e^{j\hat{\theta}_{k_m,l}}$ represents a channel phase shift parameter of the $m^{th}$ transmitting antenna of the remote transmitter, $y_n^k(l)$ represents a measurement signal received by the $n^{th}$ receiving antenna of the receiver, $s_m^k$ represents a measurement signal transmitted on the $k^{th}$ subcarrier by the $m^{th}$ transmitting antenna of the remote transmitter, and $[\hat{H}^k]^\dagger$ represents a conjugate matrix of $\hat{H}^k$, $\forall m=\{1,\ldots,M\}$, $\forall n=\{1,\ldots,N\}$.

In combination with the fourth possible implementation manner of the third aspect, in a fifth possible implementation manner, it is specifically implemented as follows: a formula for the receiver to determine the signal compensation from the M transmitting antennas of the remote transmitter to the N receiving antennas of the receiver according to the channel estimation parameters and the channel phase shift parameters is specifically as follows:

$$\begin{bmatrix} \hat{x}_1^k \\ \vdots \\ \hat{x}_M^k \end{bmatrix} = \begin{bmatrix} e^{-j\hat{\theta}_{k_1,l}} & \cdots & 0 \\ \vdots & \vdots & \vdots \\ 0 & \cdots & e^{-j\hat{\theta}_{k_M,l}} \end{bmatrix} [[\hat{H}^k]^\dagger \hat{H}^k]^{-1} [\hat{H}^k]^\dagger \begin{bmatrix} y_1^k(l) \\ \vdots \\ y_N^k(l) \end{bmatrix}$$

wherein $\hat{x}_m^k$ represents a quadrature amplitude modulation (QAM) signal of the $k^{th}$ subcarrier transmitted by the $m^{th}$ transmitting antenna.

In a fourth aspect, a multiple-input multiple-output orthogonal frequency division multiplexing communication system is provided, including a transmitter and the receiver in the third aspect or in any possible implementation manner from the first possible implementation manner of the third aspect to the fifth possible implementation manner of the third aspect, wherein the transmitter is configured to send, via M transmitting antennas, a plurality of channel estimation preamble signals to N receiving antennas of the receiver, wherein the plurality of channel estimation preamble signals contain measurement signals of the M transmitting antennas of the remote transmitter, and M and N are integers larger than 1.

In combination with the fourth aspect, in a first possible implementation manner, it is specifically implemented as follows: a subcarrier set for sending a measurement signal of the $m^{th}$ transmitting antenna in the M transmitting antennas is equal to a subcarrier set of the $m^{th}$ transmitting antenna, $\forall m=\{1,\ldots,M\}$, and the measurement signal includes a pilot signal.

In combination with the fourth aspect or the first possible implementation manner of the fourth aspect, in a second possible implementation manner, it is specifically implemented as follows: any two adjacent measurement signals of one of the plurality of channel estimation preamble signals are isolated by at least one void subcarrier.

In combination with the fourth aspect or the first possible implementation manner of the fourth aspect or the second possible implementation manner of the fourth aspect, in a third possible implementation manner, it is specifically implemented as follows: any two transmitting antennas in the M transmitting antennas do not simultaneously send the plurality of channel estimation preamble signals.

According to the method for signal compensation and the multiple-input multiple-output orthogonal frequency division multiplexing communication system provided by the embodiments of the present invention, the channel estimation parameters and the channel phase shift parameters are determined according to the measurement signals of the remote transmitter, and the signal compensation is further determined, thereby improving accuracy of an estimated value of transmitted data.

BRIEF DESCRIPTION OF DRAWINGS

FIG. 4 is a schematic diagram of a pilot of a data symbol in an embodiment of the present invention.

FIG. 5 is a schematic diagram of a functionality partition of subcarriers in an embodiment of the present invention.

FIG. 6 is a flowchart of a method for sending a signal in an embodiment of the present invention.

DESCRIPTION OF EMBODIMENTS

Figure 1:
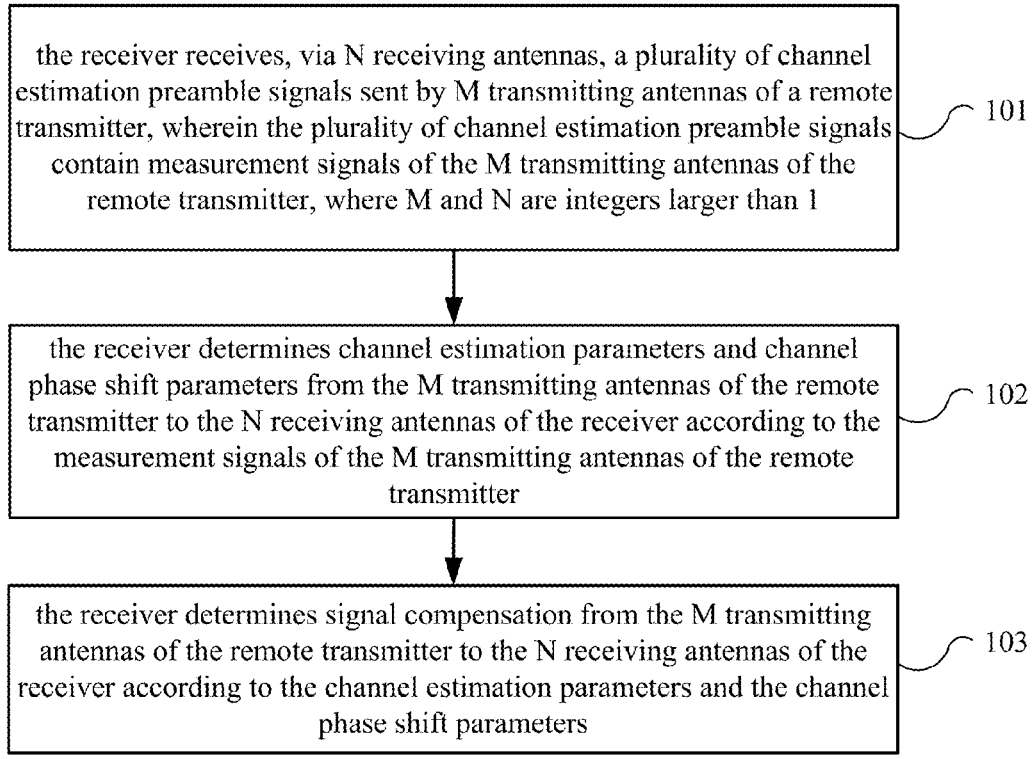
FIG. 1 is a flowchart of a method for signal compensation in an embodiment of the present invention.

FIG. 1 is a flowchart of a method for signal compensation in an embodiment of the present invention. The method shown in FIG. 1 is executed by a receiver. The receiver mentioned herein refers to a receiving end device of an MIMO-OFDM system, and it may be a base station, a mobility management entity (MME), a gateway or other network element, which is not limited herein in the embodiment of the present invention.

101, the receiver receives, via N receiving antennas, a plurality of channel estimation preamble signals sent by M transmitting antennas of a remote transmitter, wherein the plurality of channel estimation preamble signals contain measurement signals of the M transmitting antennas of the remote transmitter, where M and N are integers larger than 1.

102, the receiver determines channel estimation parameters and channel phase shift parameters from the M transmitting antennas of the remote transmitter to the N receiving antennas of the receiver according to the measurement signals of the M transmitting antennas of the remote transmitter.

103, the receiver determines signal compensation from the M transmitting antennas of the remote transmitter to the N receiving antennas of the receiver according to the channel estimation parameters and the channel phase shift parameters.

In the embodiment of the present invention, the channel estimation parameters and the channel phase shift parameters are determined according to the measurement signals of the remote transmitter, and the signal compensation is further determined, thereby improving accuracy of an estimated value of transmitted data.

Optionally, a subcarrier set for sending a measurement signal of the $m^{th}$ transmitting antenna in the M transmitting antennas is equal to a set of subcarriers of the $m^{th}$ transmitting antenna, where $\forall m=\{1, \ldots, M\}$. By sending the measurement signal on an entire range of carriers of one transmitting antenna, a receiver at a receiving end is enabled to obtain the channel estimation parameters and the channel phase shift parameters of all subcarriers of the transmitting antenna.

In the embodiment of the present invention, a measurement signal may be a preset measurement signal. The transmitter and the receiver may appoint a signal parameter of the measurement signal in advance, such as, for example, a transmitting power and the like; or, the transmitter and the receiver may determine a signal parameter of the measurement signal according to protocol regulation.

Preferably, the measurement signal may include a pilot signal. Certainly, a possibility of using other signal as the measurement signal is not excluded.

Optionally, the determining, by the receiver, the channel estimation parameters and the channel phase shift parameters from the M transmitting antennas of the remote transmitter to the N receiving antennas of the receiver according to the measurement signals of the M transmitting antennas of the remote transmitter, may be specifically implemented as follows: the receiver determines the channel estimation parameters from the M transmitting antennas of the remote transmitter to the N receiving antennas of the receiver according to measurement signals transmitted by the M transmitting antennas of the remote transmitter and measurement signals received by the N receiving antennas of the receiver; and the receiver determines the channel phase shift parameters from the M transmitting antennas of the remote transmitter to the N receiving antennas of the receiver according to the measurement signals transmitted by the M transmitting antennas of the remote transmitter, the measurement signals received by the N receiving antennas of the receiver, and the channel estimation parameters from the M transmitting antennas of the remote transmitter to the N receiving antennas of the receiver.

Optionally, as one embodiment, the determining, by the receiver, the channel estimation parameters and the channel phase shift parameters from the M transmitting antennas of the remote transmitter to the N receiving antennas of the receiver according to the measurement signals of the M transmitting antennas of the remote transmitter may include: determining, by the receiver, at least one channel estimation parameter and at least one channel phase shift parameter of the $m^{th}$ transmitting antenna for the $k^{th}$ subcarrier according to at least one measurement signal of the $m^{th}$ transmitting antenna on the $k^{th}$ subcarrier; and determining, by the receiver, an average value of the at least one channel estimation parameter of the $m^{th}$ transmitting antenna for the $k^{th}$ subcarrier and an average value of the at least one channel phase shift parameter of the $m^{th}$ transmitting antenna for the $k^{th}$ subcarrier as a channel estimation parameter and a channel phase shift parameter of the $m^{th}$ transmitting antenna for the $k^{th}$ subcarrier, wherein the $m^{th}$ transmitting antenna is one of the M transmitting antennas, $\forall m=\{1, \ldots, M\}$.

In one embodiment of the present invention, it is assumed that the transmitter of the MIMO-OFDM system sends the $l^{th}$ channel estimation preamble signal via the $m^{th}$ transmitting antenna, wherein a pilot signal in the channel estimation preamble signal is used as the measurement signal, and a subcarrier set for sending the pilot signal is K. On the $k^{th}$ subcarrier, where $k \in K$, signals of the N receiving antennas may be expressed by formula (1).

$$\begin{bmatrix} y_1^k(l) \\ \vdots \\ y_N^k(l) \end{bmatrix} = \begin{bmatrix} H_{11}^k & \cdots & H_{1M}^k \\ \vdots & \cdots & \vdots \\ H_{N1}^k & \cdots & H_{NM}^k \end{bmatrix} \begin{bmatrix} 0 \\ \vdots \\ 0 \\ s^k \\ 0 \\ \vdots \\ 0 \end{bmatrix} e^{j\theta_l} + \quad (1)$$

$$ICI_l + z_l = \begin{bmatrix} H_{1m}^k e^{j\theta_l} s^k \\ \vdots \\ H_{Nm}^k e^{j\theta_l} s^k \end{bmatrix} + ICI_l + z_l$$

where $$\begin{bmatrix} y_1^k(l) \\ \vdots \\ y_N^k(l) \end{bmatrix}$$

represents signals received on the $l^{th}$ subcarrier by the N receiving antennas of the receiver;

$$\underbrace{\begin{bmatrix} H_{11}^k & \cdots & H_{1M}^k \\ \vdots & \cdots & \vdots \\ H_{N1}^k & \cdots & H_{NM}^k \end{bmatrix}}_{H^k}$$

represents the channel parameter from the M transmitting antennas of the transmitter to the N receiving antennas of the receiver; $s^k$ represents the pilot signal of the $k^{th}$ subcarrier; $e^{j\Theta_l}$ represents the phase shift parameter of the $l^{th}$ subcarrier; $ICI_l$ represents the inter-carrier interference of the $l^{th}$ subcarrier; $z_l$ represents the noise of the $l^{th}$ subcarrier.

Formula (2) may be obtained according to LS estimation.

$$\hat{H}_{nm}^k = \frac{y_n^k(l)}{s^k} \approx H_{nm}^k e^{j\theta_l}, \forall n = \{1, \ldots, N\}, k \in K \quad (2)$$

In order to represent all of channel estimations of the $k^{th}$ subcarrier, namely $\{\hat{H}_{nm}^k, \forall n, m\}$, it is assumed that the $m^{th}$ antenna sends in $k_m$ numbers of channel estimation preamble signals and the $k^{th}$ subcarrier is a subcarrier for sending a pilot signal, then $k^{th}$ subcarrier $$\hat{H}_{nm}^k \approx H_{nm}^k e^{j\theta_{k_m}}, \forall n = \{1, \ldots, N\}, \forall m = \{1, \ldots, M\} \quad (3)$$

At a data demodulation stage, it is necessary to track a phase shift caused by a phase noise and a frequency offset. Optionally, a pilot signal may be inserted into an OFDM data symbol, and the phase shift is estimated via the pilot signal. Receiving signals on the $k^{th}$ pilot subcarrier of the $l^{th}$ OFDM data symbol may be expressed by formula (4).

$$\begin{bmatrix} y_1^k(l) \\ \vdots \\ y_N^k(l) \end{bmatrix} = H^k \begin{bmatrix} s_1^k \\ \vdots \\ s_m^k \end{bmatrix} e^{j\theta_l} + ICI_l + z_l \quad (4)$$

Formula (5) may be obtained by substituting formula (3) into formula (4).

$$\begin{bmatrix} y_1^k(l) \\ \vdots \\ y_N^k(l) \end{bmatrix} \approx \hat{H}^k \begin{bmatrix} s_1^k & \cdots & 0 \\ \vdots & \vdots & \vdots \\ 0 & \cdots & s_M^k \end{bmatrix} \begin{bmatrix} e^{j\theta_{k_1,l}} \\ \vdots \\ e^{j\theta_{k_M,l}} \end{bmatrix} + ICI_l + z_l \quad (5)$$

Formula (6) may be obtained by the LS estimation.

$$\begin{bmatrix} e^{j\hat{\theta}_{k_1,l}} \\ \vdots \\ e^{j\hat{\theta}_{k_M,l}} \end{bmatrix} \approx \begin{bmatrix} s_1^k & \cdots & 0 \\ \vdots & \vdots & \vdots \\ 0 & \cdots & s_M^k \end{bmatrix} \left[[\hat{H}^k]^\dagger \hat{H}^k\right]^{-1} [\hat{H}^k]^\dagger \begin{bmatrix} y_1^k(l) \\ \vdots \\ y_N^k(l) \end{bmatrix} \quad (6)$$

where $\theta_{k_m,l} = \theta_l - \theta_{k_m}$, and $[\hat{H}^k]^\dagger$ represents a conjugate matrix of $\hat{H}^k$.

If there exists other pilot subcarrier g satisfying $k_m = g_m$, $\forall m$, that is, each transmitting antenna simultaneously sends pilot signals on the subcarriers k and g, and a more accurate estimation may be obtained by averaging over estimated values obtained from the subcarriers k and g. If there are a plurality of such subcarriers, a more accurate estimated value may be obtained by averaging over the plurality of such subcarriers. Specifically, it is assumed that in a set P, if $k, g \in P$, then $k_m = g_m$, $\forall m$, and an average value may be figured out as shown in formula (7).

$$e^{j\hat{\theta}_{k_m,l}} = \frac{\sum_{n \in P} e^{j\hat{\theta}_{n_m,l}}}{|P|}, \forall m = \{1, \ldots, M\} \quad (7)$$

where |P| represents a cardinal number of the set P.

After tracking the phase shift caused by the phase noise and the frequency offset, it is necessary to compensate data. Specifically, received signals on the $d^{th}$ data subcarrier of the $l^{th}$ OFDM data symbol may be expressed by formula (8).

$$\begin{bmatrix} y_1^d(l) \\ \vdots \\ y_N^d(l) \end{bmatrix} = H^d \begin{bmatrix} x_1^d \\ \vdots \\ x_M^d \end{bmatrix} e^{j\theta_l} + ICI_l + z_l \quad (8)$$

where $x_m^k$ represents a QAM signal of the $k^{th}$ subcarrier transmitted by the $m^{th}$ transmitting antenna. Formula (9) may be obtained by substituting formula (3) into formula (8).

$$\begin{bmatrix} y_1^d(l) \\ \vdots \\ y_N^d(l) \end{bmatrix} \approx \hat{H}^d \begin{bmatrix} x_1^d & \cdots & 0 \\ \vdots & \vdots & \vdots \\ 0 & \cdots & x_M^d \end{bmatrix} \begin{bmatrix} e^{j\theta_{d_1,l}} \\ \vdots \\ e^{j\theta_{d_M,l}} \end{bmatrix} + ICI_l + z_l \quad (9)$$

Formula (10) may be obtained by substituting formula (7) into formula (9) and by utilizing the LS estimation method.

$$\begin{bmatrix} \hat{x}_1^d \\ \vdots \\ \hat{x}_M^d \end{bmatrix} = \begin{bmatrix} e^{-j\hat{\theta}_{d_1,l}} & \cdots & 0 \\ \vdots & \vdots & \vdots \\ 0 & \cdots & e^{-j\hat{\theta}_{d_M,l}} \end{bmatrix} \left[[\hat{H}^d]^\dagger \hat{H}^d\right]^{-1} [\hat{H}^d]^\dagger \begin{bmatrix} y_1^d(l) \\ \vdots \\ y_N^d(l) \end{bmatrix} \quad (10)$$

Formula (10) is a channel compensation formula determined according to the channel estimation parameters and the channel phase shift parameters. It should be noted that, in formula (8) to formula (10), a serial number of a subcarrier is represented by d instead of k, so as to distinguish a serial number of a data subcarrier from a serial number of a pilot subcarrier. A pilot signal $\hat{s}k$ in a pilot subcarrier is known at a receiving end, while a data signal $\hat{x}^d$ in a data subcarrier d is unknown at the receiving end and is the data needing to be demodulated.

In addition, in order to reduce inter-carrier interference (Inter-Carrier Interference, ICI), when the transmitting antennas of the transmitter send the channel estimation preamble signals, a void subcarrier may be inserted between pilot signals. In one preferable solution, a same number of void subcarriers may be inserted between the pilot signals. The larger a quantity of the inserted void subcarriers is, the smaller a value of the ICI is.

Figure 2:
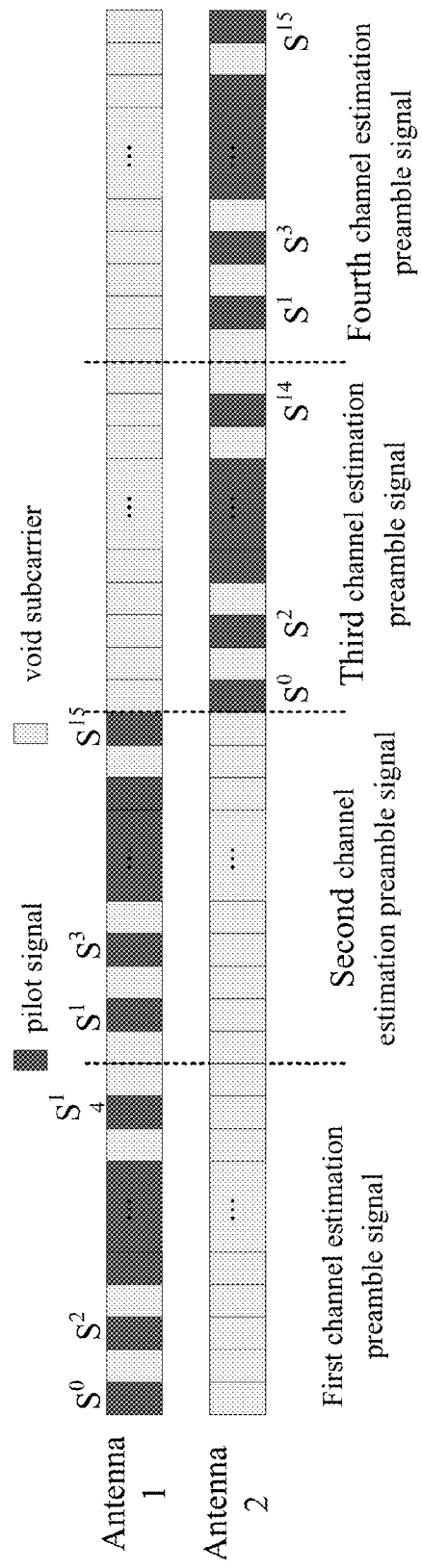
FIG. 2 is a schematic diagram of a transmission manner of a channel preamble signal in an embodiment of the present invention.

The method in the embodiment of the present invention is further illustrated below by taking a system with 2×2 MIMO-OFDM and K=16 numbers of subcarriers as an example. In this case, M=2, and N=2. FIG. 2 is a schematic diagram of a transmission manner of channel preamble signals in an embodiment of the present invention. In FIG. 2, a void sub carrier is inserted between every two pilot signals, where $s^k \in \{-1,1\}, \forall k \in \{0, \ldots, 15\}$.

Channel estimations as shown in formula (11) may be obtained according to formula (2).

$$\hat{H}_{n1}^k = \frac{y_n^k(1)}{s^k}, \forall n = \{1, 2\}, k \in \{0, 2 \ldots, 12, 14\}; \quad (11)$$

$$\hat{H}_{n1}^k = \frac{y_n^k(2)}{s^k}, \forall n = \{1, 2\}, k \in \{1, 3, \ldots, 13, 15\};$$

$$\hat{H}_{n2}^k = \frac{y_n^k(3)}{s^k}, \forall n = \{1, 2\}, k \in \{0, 2 \ldots, 12, 14\};$$

$$\hat{H}_{n2}^k = \frac{y_n^k(4)}{s^k}, \forall n = \{1, 2\}, k \in \{1, 3, \ldots, 13, 15\};$$

FIG. 4 is a pilot schematic diagram of a data symbol in an embodiment of the present invention. In FIG. 4, four pilot signals are inserted into OFDM data symbols and are located on the $2^{nd}$, $5^{th}$, $11^{th}$ and $14^{th}$ subcarriers.

According to formula (7), since the $2^{nd}$ and the $14^{th}$ subcarriers transmit with the $1^{st}$ and the $3^{rd}$ channel estimation pilot signals, and the $5^{th}$ and the $11^{th}$ subcarriers transmit with the $2^{nd}$ and the $4^{th}$ channel estimation pilot signals, formula (12) may be obtained.

$$e^{j\theta_{1,l}} = \left(\sum_{k=2,k=14} e^{j\theta_{k_1,l}}\right)/2; \; e^{j\theta_{3,l}} = \left(\sum_{k=2,k=14} e^{j\theta_{k_2,l}}\right)/2; \quad (12)$$

$$e^{j\theta_{2,l}} = \left(\sum_{k=5,k=11} e^{j\theta_{k_1,l}}\right)/2; \; e^{j\theta_{4,l}} = \left(\sum_{k=5,k=11} e^{j\theta_{k_2,l}}\right)/2;$$

Finally, at the data demodulation stage, a signal compensation formula as shown in formula (13) may be determined according to formula (10).

$$\begin{bmatrix} \hat{x}_1^d \\ \hat{x}_2^d \end{bmatrix} = \begin{bmatrix} e^{-j\theta_{d_1,l}} & 0 \\ 0 & e^{-j\theta_{d_2,l}} \end{bmatrix} \left[[\hat{H}^d]^\dagger \hat{H}^d\right]^{-1} [\hat{H}^d]^\dagger \begin{bmatrix} y_1^d(l) \\ y_2^d(l) \end{bmatrix} \quad (13)$$

where $\hat{x}_i^d, i = 1, 2$, represents a demodulation signal on the $d^{th}$ data subcarrier.

The method in the embodiment of the present invention is further illustrated below by taking a system with 2×2 MIMO-OFDM and K=16 numbers of subcarriers as an example. In this case, M=2, and N=2.

The method in the embodiment of the present invention is further illustrated by taking a system with 2×2 MIMO-OFDM and K=64 numbers of subcarriers as an example. In this case, M=2, and N=2.

FIG. 5 is a schematic diagram of functional partitioning of subcarriers in an embodiment of the present invention. in 64 subcarriers, wherein the $0^{th}$ to the $5^{th}$ subcarriers and the $59^{th}$ to the $63^{rd}$ subcarriers are void subcarriers all the time and do not transmit any information, and the $32^{nd}$ subcarrier is a direct current subcarrier and does not transmit any information.

Figure 3:
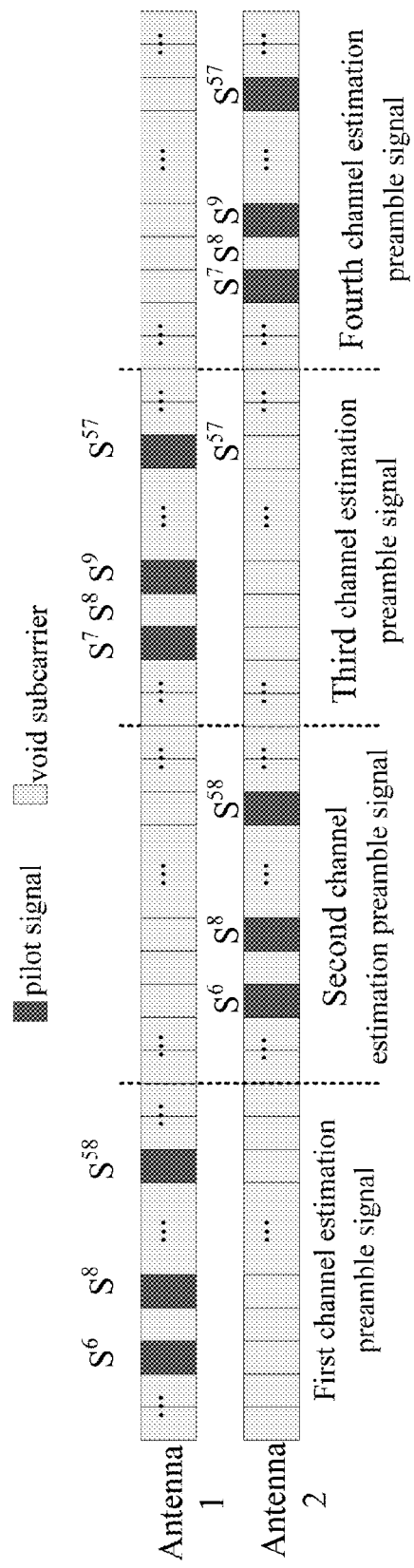
FIG. 3 is a schematic diagram of another transmission manner of a channel preamble signal in an embodiment of the present invention.

A schematic diagram of a transmission manner of a channel preamble signal in the embodiment of the present invention is as shown in FIG. 3, in which a void subcarrier is inserted between every two pilot signals, where $s^k \in \{-1,1\}$, $\forall k \in \{6, \ldots, 31, 33, \ldots, 58\}$.

Channel estimations as shown in formula (14) may be obtained according to formula (2).

$$\hat{H}_{n1}^k = \frac{y_n^k(1)}{s^k}, \forall n = \{1, 2\}, k \in \{6, 8, \ldots, 30, 34, \ldots 58\}; \quad (14)$$

$$\hat{H}_{n2}^k = \frac{y_n^k(2)}{s^k}, \forall n = \{1, 2\}, k \in \{6, 8, \ldots, 30, 34, \ldots 58\};$$

$$\hat{H}_{n1}^k = \frac{y_n^k(3)}{s^k}, \forall n = \{1, 2\}, k \in \{7, 9, \ldots, 55, 57\};$$

$$\hat{H}_{n2}^k = \frac{y_n^k(4)}{s^k}, \forall n = \{1, 2\}, k \in \{7, 9, \ldots, 55, 57\};$$

Eight pilot signals are inserted into OFDM data symbols and are respectively located on subcarriers $P_1 = \{10,22,42,54\}$ and subcarriers $P_2 = \{13,25,39,51\}$.

According to formula (7), since the subcarrier $P_1$ transmits with the $1^{st}$ and the $2^{nd}$ channel estimation pilot signals, and the subcarrier $P_2$ transmits with the $3^{rd}$ and the $4^{th}$ channel estimation pilot signals, formula (15) may be obtained.

$$e^{j\theta_{1,l}} = \left(\sum_{k \in P_1} e^{j\theta_{k_1,l}}\right)/2; \; e^{j\theta_{2,l}} = \left(\sum_{k \in P_1} e^{j\theta_{k_2,l}}\right)/2; \quad (15)$$

$$e^{j\theta_{3,l}} = \left(\sum_{k \in P_2} e^{j\theta_{k_1,l}}\right)/2; \; e^{j\theta_{4,l}} = \left(\sum_{k \in P_2} e^{j\theta_{k_2,l}}\right)/2;$$

Formula (16) may be obtained according to formula (6).

$$\begin{bmatrix} e^{j\theta_{k_1,l}} \\ e^{j\theta_{k_2,l}} \end{bmatrix} \approx \begin{bmatrix} s_1^k & 0 \\ 0 & s_2^k \end{bmatrix} \left[[\hat{H}^k]^\dagger \hat{H}^k\right]^{-1} [\hat{H}^k]^\dagger \begin{bmatrix} y_1^k(l) \\ y_2^k(l) \end{bmatrix}, \quad (16)$$

$$k \in \{P_1, P_2\}$$

Finally, at the data demodulation stage, a signal compensation formula as shown in formula (17) may be determined according to formula (10).

$$\begin{bmatrix} \hat{x}_1^d \\ \hat{x}_2^d \end{bmatrix} = \begin{bmatrix} e^{-j\theta_{d_1,l}} & 0 \\ 0 & e^{-j\theta_{d_2,l}} \end{bmatrix} \left[[\hat{H}^d]^\dagger \hat{H}^d\right]^{-1} [\hat{H}^d]^\dagger \begin{bmatrix} y_1^d(l) \\ y_2^d(l) \end{bmatrix} \quad (17)$$

where $\hat{x}_i^d=1, 2$, represents a demodulation signal on the $d^{th}$ data subcarrier.

Of course, the method in the embodiment of the present invention is not limited to the method as shown in the above-mentioned embodiment. No limitation is set to the number of the transmitting antennas, M, and the number of the receiving antennas, N, and meanwhile, and no limitation is set to the number of the subcarriers as well.

FIG. 6 is a flowchart of a method for sending a signal in an embodiment of the present invention. The method shown in FIG. 6 is executed by a transmitter.

601, the transmitter generates a plurality of channel estimation preamble signals, wherein any two adjacent measurement signals of one of the plurality of channel estimation preamble signals are isolated by at least one void subcarrier.

602, the transmitter sends the plurality of channel estimation preamble signals via M transmitting antennas to N receiving antennas of a remote receiver, wherein M and N are integers larger than 1.

In the embodiment of the present invention, by inserting a void subcarrier between measurement signals in the transmitted channel estimation preamble signals, inter-carrier interference during reception at the receiver can be reduced.

Optionally, the sending, by the transmitter, the plurality of channel estimation preamble signals via the M transmitting antennas to the N receiving antennas of the remote receiver may include: sending, by the transmitter via the M transmitting antennas in turns, the plurality of channel estimation preamble signals to the N receiving antennas of the remote receiver, wherein any two transmitting antennas in the M transmitting antennas do not simultaneously send the plurality of channel estimation preamble signals. the channel estimation preamble signals by the transmitting antennas in turns, inter-carrier interference during reception at the receiver can be further reduced.

Optionally, a subcarrier set for sending a measurement signal of the $m^{th}$ transmitting antenna in the M transmitting antennas is equal to a set of subcarriers of the $m^{th}$ transmitting antenna. By sending a measurement signal within a range of carriers of a transmitting antenna, the receiver is enabled to obtain the channel estimation parameters and the channel phase shift parameters over the full-band of the transmitting antenna.

Optionally, the measurement signal may include a pilot signal.

Figure 7:
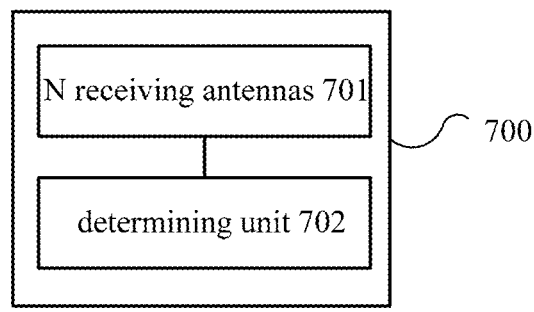
FIG. 7 is a schematic diagram of a structure of a receiver in an embodiment of the present invention.

FIG. 7 is a schematic diagram of a structure of a receiver 700 in an embodiment of the present invention. The receiver 700 may include a determining unit 702 and N receiving antennas 701.

The N receiving antennas 701 may receive a plurality of channel estimation preamble signals sent by M transmitting antennas of a remote transmitter.

The plurality of channel estimation preamble signals contain measurement signals of the M transmitting antennas of the remote transmitter, and M and N are integers larger than 1.

The determining unit 702 may determine channel estimation parameters and channel phase shift parameters from the M transmitting antennas of the remote transmitter to the N receiving antennas 701 of the receiver according to the measurement signals of the M transmitting antennas of the remote transmitter.

The determining unit 702 may further determine signal compensation from the M transmitting antennas of the remote transmitter to the N receiving antennas of the receiver according to the channel estimation parameters and the channel phase shift parameters.

In the embodiment of the present invention, the receiver 700 determines the channel estimation parameters and the channel phase shift parameters according to the measurement signals of the remote transmitter, and further determines the signal compensation, thereby improving accuracy of an estimated value of transmitted data.

In FIG. 7, although the N receiving antennas are represented by only one block diagram, it does not mean that the N receiving antennas must be a complete whole. The N receiving antennas may be a whole, or each of the N receiving antennas is an independent individual, or each of several of the N receiving antennas is an entirety, and no limitation is set herein by the embodiment of the present invention.

Optionally, a subcarrier set for sending a measurement signal of the $m^{th}$ transmitting antenna in the M transmitting antennas is equal to a set of subcarriers of the $m^{th}$ transmitting antenna, $\forall m=\{1, \ldots, M\}$. By sending the measurement signal on the entire range of carriers of a transmitting antenna, the receiver at the receiving end is enabled to obtain channel estimation parameters and channel phase shift parameters of all the subcarriers of the transmitting antenna.

Optionally, the measurement signal may include a pilot signal. Of course, a possibility of using other signal as the measurement signal is not excluded.

Optionally, when determining the channel estimation parameters and the channel phase shift parameters from the M transmitting antennas of the remote transmitter to the N receiving antennas 701 according to the measurement signals of the M transmitting antennas of the remote transmitter, the determining unit 702 may specifically determine at least one channel estimation parameter and at least one channel phase shift parameter for the $k^{th}$ sub carrier of the $m^{th}$ transmitting antenna according to at least one measurement signal on the $k^{th}$ subcarrier of the $m^{th}$ transmitting antenna, and determine an average value of the at least one channel estimation parameter for the $k^{th}$ subcarrier of the $m^{th}$ transmitting antenna and an average value of the at least one channel phase shift parameter for the $k^{th}$ subcarrier of the $m^{th}$ transmitting antenna as a channel estimation parameter and a channel phase shift parameter for the $k^{th}$ subcarrier of the $m^{th}$ transmitting antenna, wherein the $m^{th}$ transmitting antenna is one of the M transmitting antennas, $\forall m=\{1, \ldots, M\}$.

Optionally, when determining the channel estimation parameters and the channel phase shift parameters from the M transmitting antennas of the remote transmitter to the N receiving antennas 701 according to the measurement signals of the M transmitting antennas of the remote transmitter, the determining unit 702 may determine the channel estimation parameters from the M transmitting antennas of the remote transmitter to the N receiving antennas 701 according to measurement signals transmitted by the M transmitting antennas of the remote transmitter and measurement signals received by the N receiving antennas 701, and determine the channel phase shift parameters from the M transmitting antennas of the remote transmitter to the N receiving antennas 701 according to the measurement signals transmitted by the M transmitting antennas of the remote transmitter, the measurement signals received by the N receiving antennas 701 and the channel estimation parameters from the M transmitting antennas of the remote transmitter to the N receiving antennas 701.

Optionally, a formula for the determining unit 702 to determine the channel estimation parameters from the M transmitting antennas of the remote transmitter to the N receiving antennas 701 according to the measurement signals transmitted by the M transmitting antennas of the remote transmitter and the measurement signals transmitted by the N receiving antennas 701 is specifically shown in formula (18).

$$\hat{H}_{nm}{}^k = y_n{}^k(l)/s^k, \forall n=\{1,\ldots,N\}, k \in K \qquad (18)$$

where $\hat{H}_{nm}{}^k$ represents a channel parameter for the $k^{th}$ subcarrier from the $m^{th}$ transmitting antenna of the remote transmitter to the $n^{th}$ receiving antenna in the N receiving antennas 701, $y_n{}^k(l)$ represents a measurement signal received by the $n^{th}$ receiving antenna in the N receiving antennas 701, $s^k$ represents a measurement signal sent on the $k^{th}$ subcarrier by the remote transmitter, and K represents a subcarrier set of the $m^{th}$ transmitting antenna of the remote transmitter.

A formula for the determining unit 702 to determine, according to the measurement signals transmitted by the M transmitting antennas of the remote transmitter, the measurement signals received by the N receiving antennas 701 and the channel estimation parameters from the M transmitting antennas of the remote transmitter to the N receiving antennas 701, the channel phase shift parameters from the M transmitting antennas of the remote transmitter to the N receiving antennas 701, is specifically shown in formula (19).

$$\begin{bmatrix} e^{j\hat{\theta}_{k_1,l}} \\ \vdots \\ e^{j\hat{\theta}_{k_M,l}} \end{bmatrix} = \begin{bmatrix} s_1^k & \cdots & 0 \\ \vdots & \vdots & \vdots \\ 0 & \cdots & s_M^k \end{bmatrix} \left[ [\hat{H}^k]^\dagger \hat{H}^k \right]^{-1} [\hat{H}^k]^\dagger \begin{bmatrix} y_1^k(l) \\ \vdots \\ y_N^k(l) \end{bmatrix} \qquad (19)$$

where $e^{j\hat{\theta}_{k_m,l}}$ represents a channel phase shift parameter of the $m^{th}$ transmitting antenna of the remote transmitter, $y_n{}^k(l)$ represents a measurement signal received by the $n^{th}$ receiving antenna in the N receiving antennas 701, $s_m{}^k$ represents a measurement signal transmitted on the $k^{th}$ subcarrier by the $m^{th}$ transmitting antenna of the remote transmitter, and $[\hat{H}^k]^\dagger$ represents a conjugate matrix of $\hat{H}^k$, $\forall m=\{1,\ldots,M\}$, $\forall n=\{1,\ldots,N\}$.

Further, a formula for the determining unit 702 to determine the signal compensation from the M transmitting antennas of the remote transmitter to the N receiving antennas 701 according to the channel estimation parameters and the channel phase shift parameters is specifically shown in formula (20).

$$\begin{bmatrix} \hat{x}_1^d \\ \vdots \\ \hat{x}_M^d \end{bmatrix} = \begin{bmatrix} e^{-j\hat{\theta}_{d_1,l}} & \cdots & 0 \\ \vdots & \vdots & \vdots \\ 0 & \cdots & e^{-j\hat{\theta}_{d_M,l}} \end{bmatrix} \left[ [\hat{H}^d]^\dagger \hat{H}^d \right]^{-1} [\hat{H}^d]^\dagger \begin{bmatrix} y_1^d(l) \\ \vdots \\ y_N^d(l) \end{bmatrix} \qquad (20)$$

where $\hat{x}_m^d$ represents a quadrature amplitude modulation (QAM) signal of the $d^{th}$ subcarrier transmitted by the $m^{th}$ transmitting antenna.

In addition, the receiver 700 may also execute the method in FIG. 1 and implement the functions of the receiver in the embodiment shown in FIG. 1, which will not be described redundantly herein in the embodiment of the present invention.

Figure 8:
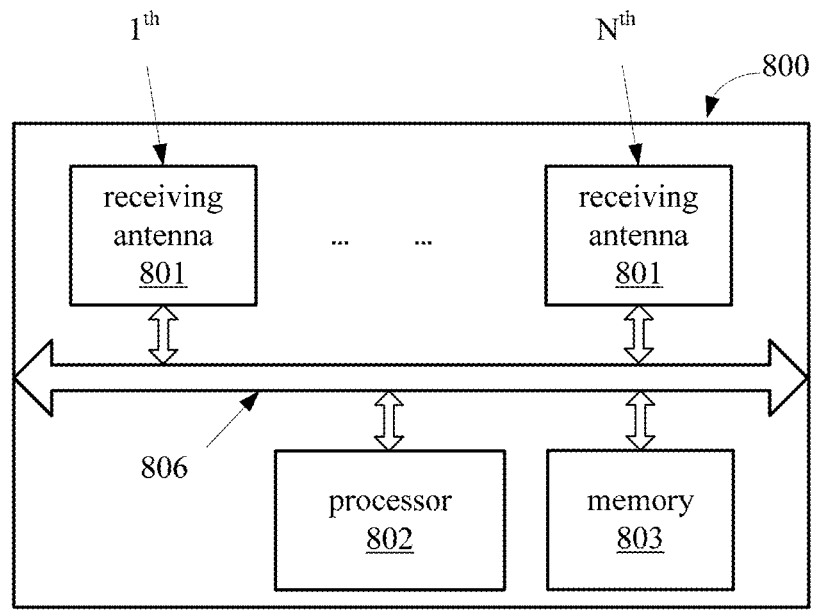
FIG. 8 is a schematic diagram of a structure of another receiver in an embodiment of the present invention.

FIG. 8 is a schematic diagram of a structure of a receiver 800 in an embodiment of the present invention. The receiver 800 may include a processor 802, a memory 803 and N receiving antennas 801.

The N receiving antennas 801 may receive a plurality of channel estimation preamble signals sent by M transmitting antennas of a remote transmitter.

The plurality of channel estimation preamble signals contain measurement signals of the M transmitting antennas of the remote transmitter, and M and N are integers larger than 1.

The processor 802 may determine channel estimation parameters and channel phase shift parameters from the M transmitting antennas of the remote transmitter to the N receiving antennas 801 of the receiver according to the measurement signals of the M transmitting antennas of the remote transmitter, and determine signal compensation from the M transmitting antennas of the remote transmitter to the N receiving antennas of the receiver according to the channel estimation parameters and the channel phase shift parameters.

The memory 803 may store an instruction for the processor 802 to determine the channel estimation parameters and the channel phase shift parameters from the M transmitting antennas of the remote transmitter to the N receiving antennas 801 of the receiver according to the measurement signals of the M transmitting antennas of the remote transmitter, and determine the signal compensation from the M transmitting antennas of the remote transmitter to the N receiving antennas of the receiver according to the channel estimation parameters and the channel phase shift parameters.

In the embodiment of the present invention, the receiver 800 determines the channel estimation parameters and the channel phase shift parameters according to the measurement signals of the remote transmitter, so as to determine the signal compensation and improve accuracy of an estimated value of transmitted data.

The processor 802 controls an operation of the receiver 800, and the processor 802 may also be referred to as a CPU (Central Processing Unit, central processing unit). The memory 803 may include a read-only memory and a random access memory, and provide an instruction and data to the processor 802. part of the memory 803 may further include a nonvolatile random access memory (NVRAM). Respective components of the receiver 800 are coupled together by a bus system 806, wherein besides a data bus, the bus system 806 may further include a power source bus, a control bus, a status signal bus and the like. But for clarity of illustration, various buses in the figure are marked as the bus system 806.

The method disclosed in the above-mentioned embodiment of the present invention may be applied to the processor 802, or may be implemented by the processor 802. The processor 802 may be an integrated circuit chip with a signal processing capability. In an implementation process, the respective steps of the above-mentioned method may be completed by an integrated logic circuit of hardware in the processor 802 or an instruction in a form of software. The above-mentioned processor 802 may be a general-purpose processor, a digital signal processor (DSP), an application-specific integrated circuit (ASIC), a field-programmable gate array (FPGA) or other programmable logic device, a discrete gate or a transistor logic device, or a discrete hardware component, and may implement or execute respective methods, steps and logic block diagrams disclosed in the embodiment of the present invention. The general-purpose processor may be a microprocessor or may be any conventional processor or the like. The steps of the method disclosed in the embodiment of the present invention may be directly executed and completed by a hardware decoding processor, or is executed and completed by a combination of hardware and software modules in the decoding processor. The software module may be located in a mature storage medium in the art, such as a random access memory, a flash memory, a read-only memory, a programmable read-only memory or an electrically erasable programmable memory, a register, etc. The storage medium is located in the memory 803, and the processor 802 reads the information in the memory 803 and completes the steps of the above-mentioned method in combination with the hardware thereof Optionally, a subcarrier set for sending a measurement signal of the $m^{th}$ transmitting antenna in the M transmitting antennas is equal to a set of subcarriers of the $m^{th}$ transmitting antenna. By sending the measurement signal on the entire range of carriers of a transmitting antenna, the receiver at the receiving end may obtain the channel estimation parameters and the channel phase shift parameters of all the subcarriers of the transmitting antenna.

Optionally, the measurement signal may include a pilot signal. Of course, a possibility of using other signal as the measurement signal is not excluded.

Optionally, when determining the channel estimation parameters and the channel phase shift parameters from the M transmitting antennas of the remote transmitter to the N receiving antennas 801 according to the measurement signals of the M transmitting antennas of the remote transmitter, the processor 802 may specifically determine at least one channel estimation parameter and at least one channel phase shift parameter of the $m^{th}$ transmitting antenna on the $k^{th}$ subcarrier according to at least one measurement signal of the $m^{th}$ transmitting antenna on the $k^{th}$ subcarrier, and determine an average value of the at least one channel estimation parameter and an average value of the at least one channel phase shift parameter of the $m^{th}$ transmitting antenna on the $k^{th}$ subcarrier as the channel estimation parameter and the channel phase shift parameter of the $m^{th}$ transmitting antenna on the $k^{th}$ subcarrier, wherein the $m^{th}$ transmitting antenna is one of the M transmitting antennas, $\forall m=\{1, \ldots, M\}$.

Optionally, when determining the channel estimation parameters and the channel phase shift parameters from the M transmitting antennas of the remote transmitter to the N receiving antennas 801 according to the measurement signals of the M transmitting antennas of the remote transmitter, the processor 802 may determine the channel estimation parameters from the M transmitting antennas of the remote transmitter to the N receiving antennas 801 according to measurement signals transmitted by the M transmitting antennas of the remote transmitter and measurement signals received by the N receiving antennas 801, and determine the channel phase shift parameters from the M transmitting antennas of the remote transmitter to the N receiving antennas 801 according to the measurement signals transmitted by the M transmitting antennas of the remote transmitter, the measurement signals received by the N receiving antennas of the receiver, and the channel estimation parameters from the M transmitting antennas of the remote transmitter to the N receiving antennas 801.

Optionally, a formula for the processor 802 to determine the channel estimation parameters from the M transmitting antennas of the remote transmitter to the N receiving antennas 801 according to measurement signals transmitted by the M transmitting antennas of the remote transmitter and measurement signals received by the N receiving antennas 801 is specifically as shown in formula (21).

$$\hat{H}_{nm}^{k}=y_{n}^{k}(l)/s^{k},\forall n=\{1,\ldots,N\},k\in K \quad (21)$$

where $\hat{H}_{nm}^{k}$ represents a channel parameter on the $k^{th}$ subcarrier from the $m^{th}$ transmitting antenna of the remote transmitter to the $n^{th}$ receiving antenna in the N receiving antennas 801, $y_{n}^{k}(l)$ represents a measurement signal received by the $n^{th}$ receiving antenna in the N receiving antennas 801, $s^{k}$ represents a measurement signal sent on the $k^{th}$ subcarrier by the remote transmitter, and K represents a set of subcarriers of the $m^{th}$ transmitting antenna of the remote transmitter.

A formula for the processor 802 to determine the channel phase shift parameters from the M transmitting antennas of the remote transmitter to the N receiving antennas 801 according to the measurement signals transmitted by the M transmitting antennas of the remote transmitter, the measurement signals received by the N receiving antennas of the receiver, and the channel estimation parameters from the M transmitting antennas of the remote transmitter to the N receiving antennas 801 is specifically as shown in formula (22)

$$\begin{bmatrix} e^{j\theta_{k_1,l}} \\ \vdots \\ e^{j\theta_{k_M,l}} \end{bmatrix} = \begin{bmatrix} s_1^k & \cdots & 0 \\ \vdots & \vdots & \vdots \\ 0 & \cdots & s_M^k \end{bmatrix} \left[ [\hat{H}^k]^{\dagger} \hat{H}^k \right]^{-1} [\hat{H}^k]^{\dagger} \begin{bmatrix} y_1^k(l) \\ \vdots \\ y_N^k(l) \end{bmatrix} \quad (22)$$

where $$e^{j\theta_{km,l}}$$

represents a channel phase shift parameter of the $m^{th}$ transmitting antenna of the remote transmitter, $y_{n}^{k}(l)$ represents a measurement signal received by the $n^{th}$ receiving antenna in the N receiving antennas 801, $s_{m}^{k}$ represents a measurement signal transmitted on the $k^{th}$ subcarrier by the $m^{th}$ transmitting antenna of the remote transmitter, and $[\hat{H}^k]^{\dagger}$ represents a conjugate matrix of $\hat{H}^k$, $\forall m=\{1,\ldots,M\}$, $\forall n=\{1,\ldots,N\}$.

Further, a formula for the processor 802 to determine the signal compensation from the M transmitting antennas of the remote transmitter to the N receiving antennas 801 according to the channel estimation parameters and the channel phase shift parameters is specifically as shown in formula (23).

$$\begin{bmatrix} \hat{x}_1^d \\ \vdots \\ \hat{x}_M^d \end{bmatrix} = \begin{bmatrix} e^{-j\theta_{d_1,l}} & \cdots & 0 \\ \vdots & \vdots & \vdots \\ 0 & \cdots & e^{-j\theta_{d_M,l}} \end{bmatrix} \left[ [\hat{H}^d]^{\dagger} \hat{H}^d \right]^{-1} [\hat{H}^d]^{\dagger} \begin{bmatrix} y_1^d(l) \\ \vdots \\ y_N^d(l) \end{bmatrix} \quad (23)$$

where $\hat{x}_m^d$ represents a quadrature amplitude modulation (QAM) signal on the $d^{th}$ subcarrier transmitted by the $m^{th}$ transmitting antenna.

In addition, the receiver 800 may also execute the method shown in FIG. 1 and implement the functions of the receiver in the embodiment shown in FIG. 1, which will not be described in detain redundantly herein in the embodiment of the present invention.

Figure 9:
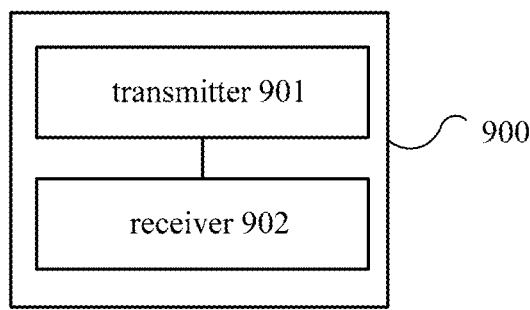
FIG. 9 is a schematic diagram of a structure of an MIMO-OFDM system in an embodiment of the present invention.

FIG. 9 is a schematic diagram of a structure of an MIMO-OFDM system 900 in an embodiment of the present invention. The MIMO-OFDM system 900 may include a transmitter 901 and a receiver 902.

The receiver 902 may be the receiver 700 shown in FIG. 7 or the receiver 800 shown in FIG. 8. The transmitter 901 is used for sending, via M transmitting antennas in turns, a plurality of channel estimation preamble signals to N receiving antennas of the receiver 902. The plurality of channel estimation preamble signals contain measurement signals of the M transmitting antennas of the transmitter 901, where M and N are integers larger than 1.

In the embodiment of the present invention, the MIMO-OFDM system 900 determines channel estimation parameters and channel phase shift parameters according to the measurement signals of the remote transmitter, and further determines signal compensation for the receiving end, thereby improving accuracy of an estimated value of transmitted data.

Optionally, a subcarrier set for sending a measurement signal of the $m^{th}$ transmitting antenna in the M transmitting antennas is equal to a set of subcarriers of the $m^{th}$ transmitting antenna, where $\forall m=\{1, \ldots, M\}$. By sending the measurement signal on an entire range of carriers of one transmitting antenna, a receiver at a receiving end is enabled to obtain the channel estimation parameters and the channel phase shift parameters of all subcarriers of the transmitting antenna.

Optionally, the measurement signal may include a pilot signal. Of course, a possibility of using other signal as the measurement signal is not excluded.

Optionally, any two adjacent measurement signals of one of the plurality of channel estimation preamble signals are isolated by at least one void subcarrier, and the void subcarrier is used for reducing inter-carrier interference (ICI) during reception at the receiver.

Optionally, any two transmitting antennas in the M transmitting antennas do not simultaneously send the plurality of channel estimation preamble signals.

In addition, the receiver and the transmitter in the embodiment of the present invention may also be combined into a transceiver device, which has the functions of the transmitter when serving as a transmitter and has the functions of the receiver when serving as a receiver, and this is not limited in the embodiments of the present invention.

Those of ordinary skill in the art may be aware that, units and algorithm steps of the examples described in the embodiments disclosed in this paper may be implemented by electronic hardware or a combination of computer software and the electronic hardware. Whether these functions are implemented in the form of hardware or software is determined by specific applications and design constraint conditions of the technical solutions. Those skilled may implement the described functions by using different methods for each specific application, but this implementation should not be considered to be beyond the scope of the present invention.

Those skilled in the art to which the present invention pertains may clearly understand that, for convenience and simplicity of description, for the specific working processes of the system, the apparatus and the units described above, please refer to corresponding processes in the foregoing method embodiments, and they will not be repeated redundantly herein.

In several embodiments provided in the present application, it should be understood that, the disclosed system, apparatus and method may be implemented in other manner.

For example, the apparatus embodiments described above are merely exemplary, e.g., partition of the units is only a logic functionality partition, and other partitioning manners may be used in a practical implementation. For example, a plurality of units or components may be combined or integrated into another system, or some features may be omitted or not implemented. From another point of view, the displayed or discussed mutual coupling or direct coupling or communication connection may be indirect coupling or communication connection of apparatuses or units through some interfaces, and may be in electrical, mechanical or other form.

The units described as separate components may be separated physically or not, the components displayed as units may be physical units or not, namely, may be located in one place, or may be distributed in a plurality of network units. A part of, or all of, the units may be selected to implement the purpose of the technical solutions in the embodiments according to actual needs.

In addition, the functional units in the embodiments of the present invention may be integrated in a processing unit, or the units separately exist physically, or two or more units are integrated in one unit.

If the function is implemented in the form of a software functional unit and is sold or used as an independent product, it may be stored in a computer readable storage medium. Based on such understanding, essence of the technical solutions of the present invention, or a part of the technical solution contributing to the prior art, or a part of the technical solutions, may be implemented in the form of a software product. The computer software product is stored in a storage medium, and includes a plurality of instructions for enabling a computer device (may be a personnel computer, a server, or a network device or the like) or a processor to execute all or a part of the steps of the methods in the embodiments of the present invention. The foregoing storage medium includes a variety of media capable of storing program codes, such as a USB disk, a mobile hard disk, a read-only memory (ROM, Read-Only Memory), a random access memory (RAM, Random Access Memory), a magnetic disk, an optical disk or the like.

The foregoing descriptions are merely specific embodiments of the present invention, rather than limiting the protection scope of the present invention. Any skilled one familiar with this art could readily think of variations or substitutions within the disclosed technical scope of the present invention, and these variations or substitutions shall fall into the protection scope of the present invention. Accordingly, the protection scope of the claims should prevail over the protection scope of the present invention.

What is claimed is:

1. A method for signal compensation, comprising:
    receiving, by a receiver via N receiving antennas, a plurality of channel estimation preamble signals sent by M transmitting antennas of a remote transmitter, wherein the plurality of channel estimation preamble signals comprise measurement signals from the M transmitting antennas, and M and N are integers larger than 1;
    determining, by the receiver, according to the measurement signals from the M transmitting antennas, channel estimation parameters for the M transmitting antennas and the N receiving antennas and channel phase shift parameters for the M transmitting antennas and the N receiving antennas, wherein determining the channel estimation parameters and the channel phase shift parameters comprises:

determining, by the receiver, at least one channel estimation parameter and at least one channel phase shift parameter of an $m^{th}$ transmitting antenna for a $k^{th}$ subcarrier according to at least one measurement signal of the $m^{th}$ transmitting antenna on the $k^{th}$ subcarrier, wherein the $m^{th}$ transmitting antenna is one of the M transmitting antennas, $\forall m=\{1, L, M\}$; and determining, by the receiver, an average value of the at least one channel estimation parameter of the $m^{th}$ transmitting antenna for the $k^{th}$ subcarrier and an average value of the at least one channel phase shift parameter of the $m^{th}$ transmitting antenna for the $k^{th}$ subcarrier as a channel estimation parameter and a channel phase shift parameter of the $m^{th}$ transmitting antenna for the $k^{th}$ subcarrier, k is integer larger than 1; and determining, by the receiver according to the channel estimation parameters and the channel phase shift parameters, signal compensation for the M transmitting antennas and the N receiving antennas.

2. The method of claim 1, wherein a subcarrier set for sending a measurement signal of an $m^{th}$ transmitting antenna of the M transmitting antennas is equal to a subcarrier set of the $m^{th}$ transmitting antenna, $\forall m=\{1, L, M\}$, and the measurement signal comprises a pilot signal.

3. A method for signal compensation, comprising:
receiving, by a receiver via N receiving antennas, a plurality of channel estimation preamble signals sent by M transmitting antennas of a remote transmitter, wherein the plurality of channel estimation preamble signals comprise measurement signals from the M transmitting antennas, and M and N are integers larger than 1;

determining, by the receiver, according to the measurement signals from the M transmitting antennas channel estimation parameters for the M transmitting antennas and the N receiving antennas and channel phase shift parameters for the M transmitting antennas and the N receiving antennas; and determining, by the receiver according to the channel estimation parameters and the channel phase shift parameters, signal compensation for the M transmitting antennas and the N receiving antennas;

wherein determining the channel estimation parameters is further according to measurement signals received by the N receiving antennas of the receiver; and wherein determining the channel phase shift parameters is further according to the measurement signals received by the N receiving antennas of the receiver;

wherein determining the channel estimation parameters is according to:

$$\hat{H}_{nm}^{k} = y_n^k(l)/s^k, \forall n=\{1, L, N\}, k \in K$$

wherein $\hat{H}_{nm}^{k}$ represents a channel parameter for a $k^{th}$ subcarrier for an $m^{th}$ transmitting antenna of the remote transmitter and an $n^{th}$ receiving antenna of the receiver, $y_n^k(l)$ represents a measurement signal received by the $n^{th}$ receiving antenna of the receiver, $s^k$ represents a measurement signal sent on the $k^{th}$ subcarrier by the remote transmitter, and K represents a set of subcarriers of the $m^{th}$ transmitting antenna of the remote transmitter; and wherein determining the channel phase shift parameters is according to:

$$\begin{bmatrix} e^{j\theta_{k_1,l}} \\ M \\ e^{j\theta_{k_M,l}} \end{bmatrix} = \begin{bmatrix} s_1^k & L & 0 \\ M & M & M \\ 0 & L & s_M^k \end{bmatrix} \left[ [\hat{H}^k]^\dagger \hat{H}^k \right]^{-1} [\hat{H}^k]^\dagger \begin{bmatrix} y_1^k(l) \\ M \\ y_N^k(l) \end{bmatrix}$$

wherein $$e^{j\theta_{km,l}}$$

represents a channel phase shift parameter of the $m^{th}$ transmitting antenna of the remote transmitter, $y_n^k(l)$ represents a measurement signal received by the $n^{th}$ receiving antenna of the receiver, $s_m^k$ represents a measurement signal transmitted on the $k^{th}$ subcarrier by the $m^{th}$ transmitting antenna of the remote transmitter, and $[\hat{H}^k]^{554}$ represents a conjugate matrix of $\hat{H}^k$, $\forall m=\{1, L, M\}$, $\forall n=\{1, L, N\}$.

4. The method of claim 3, wherein determining the signal compensation is according to:

$$\begin{bmatrix} \hat{x}_1^k \\ M \\ \hat{x}_M^k \end{bmatrix} = \begin{bmatrix} e^{-j\theta_{k_1,l}} & L & 0 \\ M & M & M \\ 0 & L & e^{-j\theta_{k_M,l}} \end{bmatrix} \left[ [\hat{H}^k]^\dagger \hat{H}^k \right]^{-1} [\hat{H}^k]^\dagger \begin{bmatrix} y_1^k(l) \\ M \\ y_N^k(l) \end{bmatrix}$$

wherein $\hat{x}_m^k$ represents a quadrature amplitude modulation (QAM) signal of the $k^{th}$ subcarrier transmitted by the $m^{th}$ transmitting antenna.

5. A receiving device, comprising:
N receiving antennas, configured to:
receive a plurality of channel estimation preamble signals sent by M transmitting antennas of a remote transmitting device, wherein the plurality of channel estimation preamble signals comprise measurement signals from the M transmitting antennas, and M and N are integers larger than 1; and a processor, configured to:
determine, according to the measurement signals from the M transmitting antennas, channel estimation parameters for the M transmitting antennas and the N receiving antennas and channel phase shift parameters for the M transmitting antennas and the N receiving antennas; and determine signal compensation for the M transmitting antennas and the N receiving antennas according to the channel estimation parameters and the channel phase shift parameters;

wherein determining the channel estimation parameters and the channel phase shift parameters further comprises:
determining at least one channel estimation parameter and at least one channel phase shift parameter of an $m^{th}$ transmitting antenna for a $k^{th}$ subcarrier according to at least one measurement signal of the $m^{th}$ transmitting antenna on the $k^{th}$ subcarrier, wherein the $m^{th}$ transmitting antenna is one of the M transmitting antennas, $\forall m=\{1, L, M\}$; and determining an average value of the at least one channel estimation parameter of the $m^{th}$ transmitting antenna for the $k^{th}$ subcarrier and an average value of the at least one channel phase shift parameter of the m$^{th}$ transmitting antenna for the k$^{th}$ subcarrier as a channel estimation parameter and a channel phase shift parameter of the m$^{th}$ transmitting antenna for the k$^{th}$ subcarrier.

6. The receiving device of claim 5, wherein a subcarrier set for sending a measurement signal of an m$^{th}$ transmitting antenna of the M transmitting antennas is equal to a subcarrier set of the m$^{th}$ transmitting antenna, $\forall$m={1,L,M}, and the measurement signal comprises a pilot signal.

7. A receiving device, comprising:
N receiving antennas, configured to receive a plurality of channel estimation preamble signals sent by M transmitting antennas of a remote transmitting device, wherein the plurality of channel estimation preamble signals comprise measurement signals from the M transmitting antennas, and M and N are integers larger than 1; and
a processor, configured to determine, according to the measurement signals from the M transmitting antennas, channel estimation parameters for the M transmitting antennas and the N receiving antennas and channel phase shift parameters for the M transmitting antennas and the N receiving antennas;
wherein the processor is further configured to determine signal compensation for the M transmitting antennas and the N receiving antennas according to the channel estimation parameters and the channel phase shift parameters;
wherein-determining the channel estimation parameters is further according to measurement signals received by the N receiving antennas of the receiving device;
wherein determining the channel phase shift parameters is further according to the measurement signals received by the N receiving antennas of the receiving device;
wherein determining the channel estimation parameters is according to:

$\hat{H}_{nm}^k = y_n^k(l)/s^k, \forall n=\{1, L, N\}, k \in K$ wherein $\hat{H}_{nm}^k$ represents a channel parameter for a k$^{th}$ subcarrier for an m$^{th}$ transmitting antenna of the remote transmitting device and the n$^{th}$ receiving antenna of the receiving device, $y_n^k(l)$ represents a measurement signal received by the n$^{th}$ receiving antenna of the receiving device, s$^k$ represents a measurement signal sent on the k$^{th}$ subcarrier by the remote transmitting device, and K represents a set of subcarriers of the m$^{th}$ transmitting antenna of the remote transmitting device; and
wherein determining the channel phase shift parameters is according to:

$$\begin{bmatrix} e^{j\hat{\theta}_{k_1,l}} \\ M \\ e^{j\hat{\theta}_{k_M,l}} \end{bmatrix} = \begin{bmatrix} s_1^k & L & 0 \\ M & M & M \\ 0 & L & s_M^k \end{bmatrix} \left[[\hat{H}^k]^\dagger \hat{H}^k\right]^{-1} [\hat{H}^k]^\dagger \begin{bmatrix} y_1^k(l) \\ M \\ y_N^k(l) \end{bmatrix}$$

wherein $e^{j\hat{\theta}_{km,l}}$ represents a channel phase shift parameter of the m$^{th}$ transmitting antenna of the remote transmitting device, $y_n^k(l)$ represents a measurement signal received by the n$^{th}$ receiving antenna of the receiving device, $s_m^k$ represents a measurement signal transmitted on the k$^{th}$ subcarrier by the m$^{th}$ transmitting antenna of the remote transmitting device, and $[\hat{H}^k]^{554}$ represents a conjugate matrix of $\hat{H}^k$, $\forall$m={1,L,M}, $\forall$n={1,L,N}.

8. A multiple-input multiple-output orthogonal frequency division multiplexing communication system, comprising:
a transmitting device, configured to send, via M transmitting antennas, a plurality of channel estimation preamble signals to N receiving antennas of a receiving device, wherein the plurality of channel estimation preamble signals contain measurement signals from the M transmitting antennas of the remote transmitting device, and M and N are integers larger than 1; and
the receiving device, wherein the receiving device comprises:
N receiving antennas, configured to receive the plurality of channel estimation preamble signals; and
a processor, configured to determine, according to the measurement signals from the M transmitting antennas, channel estimation parameters for the M transmitting antennas and the N receiving antennas and channel phase shift parameters for the M transmitting antennas and the N receiving antennas;
wherein the processor is further configured to determine signal compensation for the M transmitting antennas and the N receiving antennas according to the channel estimation parameters and the channel phase shift parameters;
wherein determining the channel estimation parameters is according to:

$\hat{H}_{nm}^k = y_n^k(l)/s^k, \forall n=\{1, L, N\}, k \in K$ wherein $\hat{H}_{nm}^k$ represents a channel parameter for a k$^{th}$ subcarrier for an m$^{th}$ transmitting antenna of the remote transmitting device and the n$^{th}$ receiving antenna of the receiving device, $y_n^k(l)$ represents a measurement signal received by the n$^{th}$ receiving antenna of the receiving device, s$^k$ represents a measurement signal sent on the k$^{th}$ subcarrier by the remote transmitting device, and K represents a set of subcarriers of the m$^{th}$ transmitting antenna of the remote transmitting device; and
wherein determining the channel phase shift parameters is according to:

$$\begin{bmatrix} e^{j\hat{\theta}_{k_1,l}} \\ M \\ e^{j\hat{\theta}_{k_M,l}} \end{bmatrix} = \begin{bmatrix} s_1^k & L & 0 \\ M & M & M \\ 0 & L & s_M^k \end{bmatrix} \left[[\hat{H}^k]^\dagger \hat{H}^k\right]^{-1} [\hat{H}^k]^\dagger \begin{bmatrix} y_1^k(l) \\ M \\ y_N^k(l) \end{bmatrix}$$

wherein $e^{j\hat{\theta}_{km,l}}$ represents a channel phase shift parameter of the m$^{th}$ transmitting antenna of the remote transmitting device, $y_n^k(l)$ represents a measurement signal received by the n$^{th}$ receiving antenna of the receiving device, $s_m^k$ represents a measurement signal transmitted on the k$^{th}$ subcarrier by the m$^{th}$ transmitting antenna of the remote transmitting device, and $[\hat{H}^k]^{554}$ represents a conjugate matrix of $\hat{H}^k$, $\forall$m={1, L,M}, $\forall$n={1,L,N}.

9. The system of claim 8, wherein a subcarrier set for sending a measurement signal of an m$^{th}$ transmitting antenna of the M transmitting antennas is equal to a subcarrier set of the $m^{th}$ transmitting antenna, $\forall m=\{1, L, M\}$, and the measurement signal comprises a pilot signal.

10. The system of claim 8, wherein any two adjacent measurement signals of one of the plurality of channel estimation preamble signals are isolated by at least one void subcarrier.

11. The system of claim 8, wherein any two transmitting antennas of the M transmitting antennas do not simultaneously send channel estimation preamble signals.

* * * * *